United States Patent

Goebels

[11] 4,196,941
[45] Apr. 8, 1980

[54] WHEEL LOCK-UP PREVENTION APPARATUS

[75] Inventor: Hermann-Josef Goebels, Schwieberdingen, Fed. Rep. of Germany

[73] Assignee: Robert Bosch GmbH, Stuttgart, Fed. Rep. of Germany

[21] Appl. No.: 847,296

[22] Filed: Oct. 31, 1977

[30] Foreign Application Priority Data

Dec. 10, 1976 [DE] Fed. Rep. of Germany ....... 2655951

[51] Int. Cl.² ............................................. B60T 13/68
[52] U.S. Cl. ..................................... 303/119; 60/569; 60/591
[58] Field of Search .................. 303/118, 119, 113; 60/545, 569, 591

[56] References Cited

FOREIGN PATENT DOCUMENTS 2242746  3/1974  Fed. Rep. of Germany ........... 303/119

*Primary Examiner*—Charles E Frankfort
*Assistant Examiner*—Reinhard J. Eisenzopf
*Attorney, Agent, or Firm*—Edwin E. Greigg

[57] ABSTRACT

There is provided a wheel lock-up prevention device for compressed air operated brakes of a motor vehicle which includes a common control of the pressure in the brakecylinders of a given wheel axle. The control is accomplished by means of multi-position main valves which include magnetic pre-control valves with identical control magnets and with armatures having integral closure bodies. Furthermore, the valve bodies of the multi-position valves are substantially identical at least on their pressure side. The use of such simple and identical valves provides a modular-like construction making possible a selective 2-point or 3-point operation as well as a single-duct or a multi-duct embodiment of the wheel lock-up prevention device. Thus, during a functional test at the beginning of a trip, a dangerous and hence undesired release of the brakes when parked on an incline is prevented by means of the actuation of all of the magnets.

4 Claims, 7 Drawing Figures

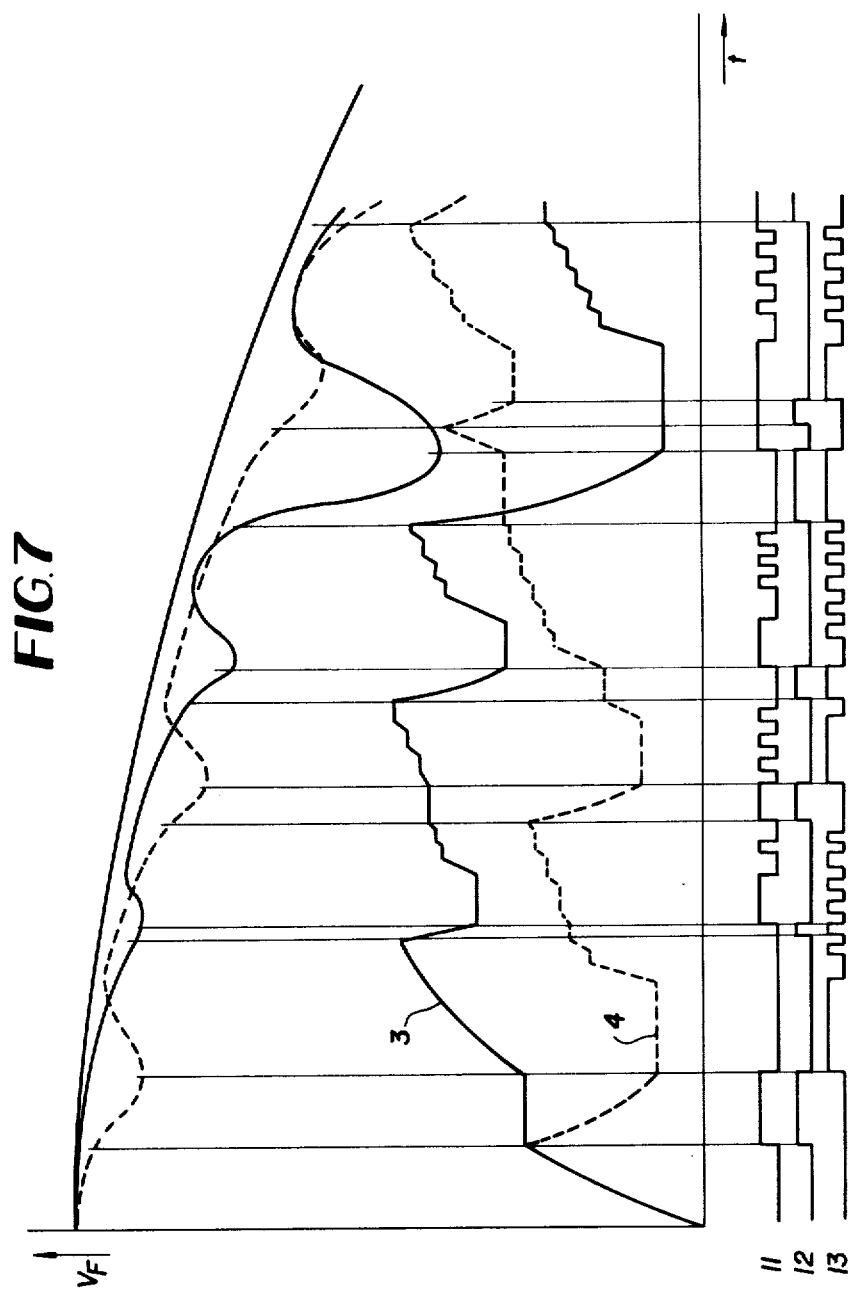

WHEEL LOCK-UP PREVENTION APPARATUS

BACKGROUND OF THE INVENTION

The invention provides a wheel lock-up prevention device for compressed air operated wheel brakes in a motor vehicle comprising a common control of the brake pressure in the brake cylinders of the motor vehicle axle and more particularly an assembly wherein a common 3/2-way valve is inserted into the brake line leading to the two brake cylinders. Further the brake line in such assembly is conducted downstream of the 3/2-way valve via a separate branch line to an individual brake cylinder wherein an individual 2/2-way valve is inserted into each branch line as defined in U.S. Pat. application Ser. No. 800,598, filed May 25, 1977, now U.S. Pat. No. 4,153,307.

The use of double diaphragm valves for wheel brake lock-up prevention apparatus is already known from DT-OS 2 234 229. The one diaphragm disclosed therein is subjected to a brake line passage pressure and the other diaphragm guards an outside air connection. However, an advantageous combination of such a diaphragm valve with an electromagnet and a multiple application of such a combination with its variations are not disclosed by this concept.

OBJECT AND SUMMARY OF THE INVENTION

The primary object of the present invention is to provide an assembly in which multi-position main valves are each arranged to cooperate with integrally housed magnetic pre-control valves having armatures adapted to close individual brake lines.

Another object of the present invention is to provide an assembly that enables one to achieve a selective 2-point or 3-point control, that is, on the one hand one can have a closing and opening of the brake line passage or on the other hand a closure, pressure maintenance and opening of the brake line passage.

A further advantageous object of the invention is achieved by a simple means via the omission or the inclusion of a 2/2-way valve to supply the brake cylinders of a given axle via a single 2/2-way valve (1-duct embodiment), or else to supply each brake cylinder via its own 2/2-way valve (2-duct embodiment).

Still another advantageous object of the invention is to provide for a variation of the effective surface of the oppositely disposed surfaces of a diaphragm valve by means of a complementally formed support structure which is arranged in such a manner that the effective differential surface of the oppositely disposed surfaces of the two diaphragms assume a maximal value in the direction of closure of the valve, which differential value is then substantially cancelled in the open direction, i.e. in the actuated state of the valve. Accordingly, the operative switching thresholds yield the shortest switching times of the valve, and this fact is of the greatest importance in wheel lock-up prevention apparatus of the type described herein.

Yet another object of the present invention is to provide a wheel lock-up prevention assembly which is adapted to prevent a dangerous and hence undesired release of the brakes when the motor vehicle is parked on an incline, by means of the actuation of all the magnets during a functional test conducted at the beginning of a trip.

Other objects and advantages of the present invention will be more readily apparent from a further consideration of the following detailed description of the drawings illustrating several preferred embodiments of the invention, in which:

BRIEF DESCRIPTION OF THE DRAWINGS

FIG. 7 shows diagrammatically the control system for a brake lock-up prevention apparatus.

DESCRIPTION OF THE PREFERRED EMBODIMENTS

Figure 1:
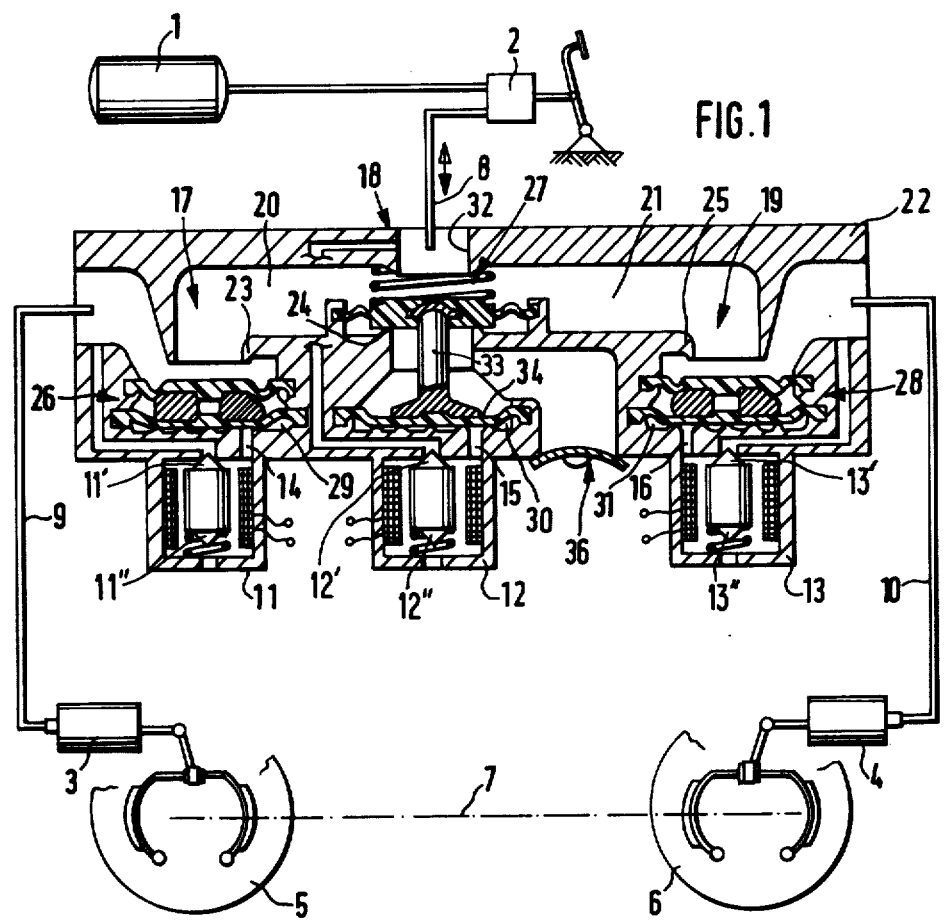
FIG. 1 shows schematically a pressure control valve unit having a 2-duct system.

Turning now to the drawings, a pressurized air storage container 1 is connected to a brake valve 2 arranged to supply two brake cylinders 3 and 4 which are adapted to actuate the wheel brakes of two vehicle wheels 5 and 6 that are associated with the vehicle axle 7.

Located in lines 8, 9 and 10 which lead from the brake valve 2 to the brake cylinders 3 and 4 are three magnetic pre-control valves 11, 12 and 13 that are adapted to control the line connections 14, 15 and 16 which, in turn, lead to main valves 17, 18 and 19. The main valve 18 is directly connected to the line 8 and thereby provides a direct connection to the brake valve 2. This main valve 18 is constructed as a 3/2-way valve and controls line branches 20, 21 which communicate with the other two main valves 17 and 19, that are merely 2/2-way valves. Thus, it can be seen that with this arrangement the 3/2-way valve 18 is disposed in the lines 8, 9 and 10 which lead to the brake cylinders 3 and 4. The brake line 20 extends downstream of the 3/2-way valve in a direction toward brake cylinder 3, and another line 21 extends downstream to brake cylinder 4. It is also to be noted that 2/2-way valves 17 and 19 are inserted into each line branch 20, 21.

The three electromagnetic pre-control valves 11, 12 and 13 and the three main valves 17, 18 and 19 are combined into a complete valve assembly denoted 22. This valve unit is provided with three valve seats 23, 24 and 25 with the passages therein being controlled by the diaphragm members 26, 27 and 28 that comprise valve closure members. The line connections 14, 15 and 16 that extend from the pre-control valves 11, 12 and 13 and lead into working chambers 29, 30 and 31 are bounded by the diaphragm members 26, 27 and 28.

The brake line 8 is connected to a valve inlet as at 32. The inlet 32 leads to the valve seat 24 of the 3/2-way main valve 18 and a push rod 33 which penetrates the seat 24 is attached to the diaphragm member 27 of the valve 18. At its other end the push rod 33 carries a diaphragm body 34 comprising the working component on the pressure side. The diaphragm member 27 and the valve seat 24 which is attached to the housing together form an outlet valve 24/27 of the 3/2-way valve 18 and serve to control an outside air connection 36.

METHOD OF OPERATION

During normal braking, a free brake passage exists from the brake valve 2 via the brake lines 8, 9, 10 to the brake cylinders 3 and 4. Thus, braking air reaches the brake cylinders 3 and 4 via the 3/2-way valve 18, the line branches 20 and 21, and the two 2/2-way valves 17 and 19.

The operation of the wheel lock-up prevention apparatus is now explained with reference to FIG. 7 which represents a diagrammatic view of the control system for the brakes. In this diagram the time is plotted along the abscissa and along the ordinate the brake pressure is plotted at the bottom (dashed line for the brake cylinder 4 and solid line for the brake cylinder 3) and the vehicle velocity as well as the wheel velocity, is plotted at the top.

If a wheel is overbraked, for example, the wheel 6 with its brake cylinder 4, then the lock-up prevention apparatus responds and the pre-control valves 11 and 12 switch to their alternate state. The 3/2-way main valve 18 is thereby switched to its alternate state and thus allows air to flow from the brake cylinder 4 to atmosphere. The 2/2-way valve 17 simultaneously switches to its closed position so that the applied pressure is held in the brake cylinder 3 because this cylinder is presently not tending toward lock-up. At the end of the pressure descent phase of the brake cylinder 4, all of the pre-control valves 11, 12, and 13 switch states. The 3/2-way main valve 18 and the 2/2-way main valve 17 therefore switch to an air passage state in which the pressure in brake cylinder 3 rises further, and the 2/2-way main valve 19 switches to a blocking state, so that the reduced brake pressure in brake cylinder 4 is held over. After a predetermined time, at the end of the holding phase, the precontrol valve 13 once again switches to its blocking state, so that the main valve 19 once again assumes its initial position for a pressure rise. The reduced brake pressure in brake cylinder 4 is once again increased, incrementally, by means of the switching of the pre-control valve 13. The subsequent brake pressure course is evident from the diagram.

It is advantageous from the teaching of this invention that the brake pressure reduction and the brake pressure build-up of the two brake cylinders 3 and 4 can be undertaken via the common 3/2-way main valve 18 and that the thereby achievable common brake pressure modulation which is accomplished by means of the pressurization and the venting of the brake cylinders 3 and 4, can, at any time, be interrupted by means of the serially arranged 2/2-way valves 17 and 19 in the lines leading to the respective brake cylinders. Accordingly, it is thereby made possible by this system to control each of the two brake cylinders 3 and 4 individually in spite of the omission, and consequent savings, of one valve compared to an apparatus which features individual wheel regulation. Solely in the pressure descent phase of a given brake cylinder 3 or 4 is the pressure build-up in the other given brake cylinder interrupted by means of the holding phase, for the short duration of the descent time.

It is, of course, also possible by means of the proposed apparatus to decrease the pressure in the two brake cylinders 3 and 4 simultaneously.

However, the structural design of the valve unit 22, according to the invention, provides an arrangement where identical control magnets with armatures having integral closure members 11', 11", 12', 12", 13', 13", serve as the pre-control valves 11, 12 and 13. The valves 11, 12 and 13 are each assigned to the three-multi-position valves 17, 18 and 19 employed as main valves. The valves 17, 18 and 19 have diaphragm-membered valve bodies 26, 27 and 28, respectively, belonging to the multi-position valves 17, 18 and 19 are likewise identical on their pressure side. The connection to each of the working chambers 29, 30 and 31 is blocked by means of the armatures of the magnets 11, 12 and 13 during the absence of current in the shut-off position. The embodiment according to FIG. 1 comprises a 2-duct design.

Figures 3, 4:
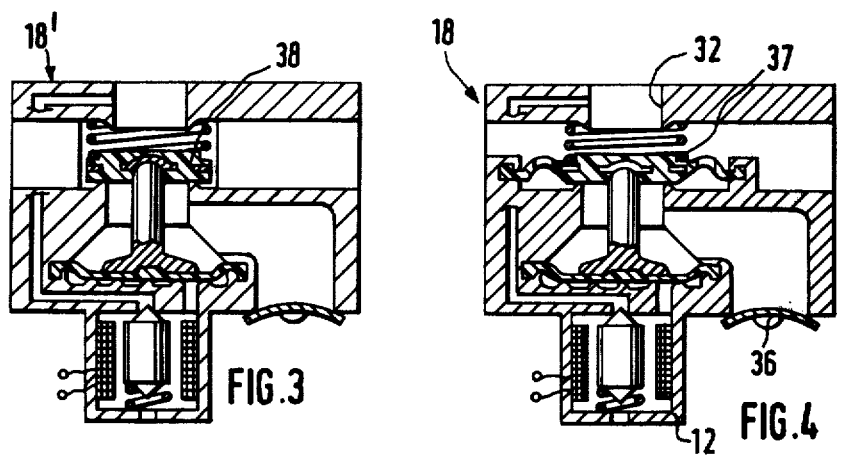
FIG. 3 shows in cross section a 3/2-way valve with a dish closure body.
FIG. 4 shows in cross section a 3/2-way valve with a diaphragm closure body.

The teaching of this invention reveals a modular-like construction which makes it possible to embody the diaphragm member 27 of the 3/2-way valve 18 in different ways, e.g. either with a dish closure body 38 such as that shown in FIG. 3 for a 3/2-way valve 18', or with a diaphragm 37 as shown in FIG. 4.

Figure 2:
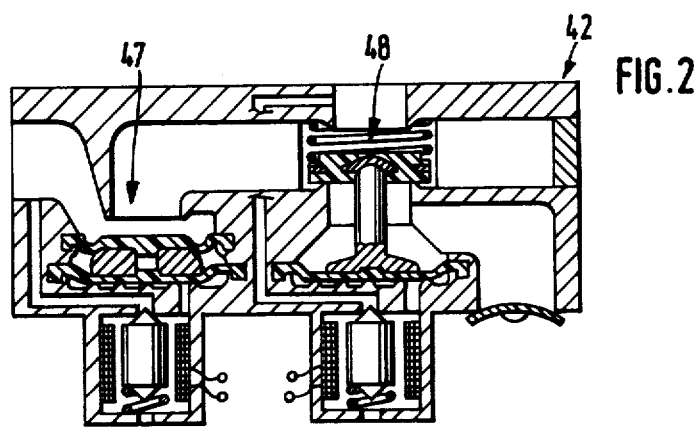
FIG. 2 shows a detailed view of a 1-duct system for a vehicle axle.

FIG. 2 shows an embodiment of a valve unit 42 with a 3/2-way valve 48 and with only one 2/2-way valve 47. The use of such a simplified construction design is possible when both brake cylinders of a given vehicle axle are to be controlled in combination. This concept is referred to as a 1-duct embodiment.

Figure 5:
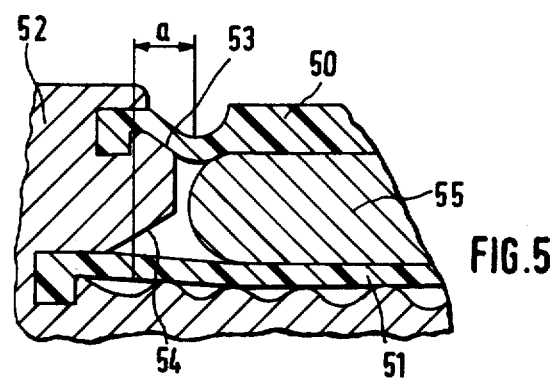
FIG. 5 shows a cross-sectional fragmentary view of a double diaphragm closure body in a lowered position.
Figure 6:
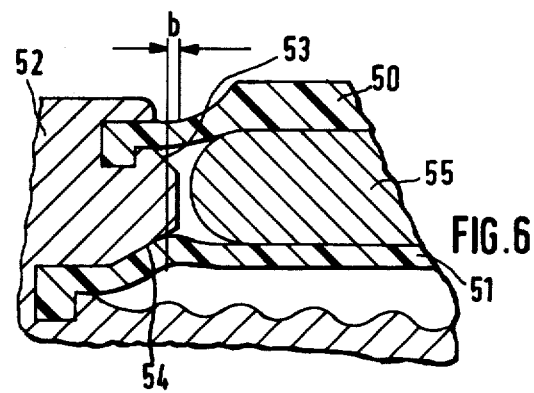
FIG. 6 shows another cross-sectional view of this diaphragm closure body in a lifted position.

The two FIGS. 5 and 6 illustrate fragmentary views of different positions of the 2/2-way double diaphragm main valves 17 and 19, as well as 47 in FIG. 2. It can be seen that each diaphragm 50 and 51 contacts convergent support areas 53 and 54 within the housing 52 so that each diaphragm is caused to undergo an effective surface variation during its stroke as it touches or lifts off either of the support areas. A pressure member 55 is disposed between the two diaphragms 50 and 51. The given effective diametric difference is designated "a" and "b" in FIGS. 5 and 6. Due to the change of the effective surfaces of the two diaphragms 50 and 51 during the stroke motion, disclosed by the maximal value of the differential surface of the double diaphragm in the lower extreme position (FIG. 5), a rapid switching from that lower position is assured during a pressure rise in either of the working chambers 29 and 31. (See FIG. 1) Accordingly the difference in the surfaces is then nearly cancelled in the upper extreme position of the double diaphragm (FIG. 6).

The shortest switching times are achieved by these means and the changeover switching points are influenced positively. It can also be seen that the control pressure acting during the pressure descent phase and the pressure maintaining phase upon the corresponding valve 17 or 19 via the then opened respective line connections 14 and 16 is simultaneously a reaction pressure from the brake cylinders 3 and 4.

Further, it can be seen also that each magnet of the magnetic valves 11, 12 or 13 can be individually actuated to achieve a certain given switching state of the wheel lock-up prevention apparatus, so that only a slight current consumption takes place.

To perform a comprehensive testing program prior to the beginning of a trip, it is an indispensible requirement to test the functional readiness of the magnetic valves as well as that of the main valves. In the past and with well-known construction designs, various special measures needed to be taken to prevent the movement of the motor vehicle, for example when parked on an incline, resulting from an undesired release of the brakes during the testing process. The various valves then had to be tested sequentially, which is time consuming and cumbersome.

In the wheel lock-up prevention apparatus according to the invention, all of the outside air connections are closed by means of the simultaneous actuation of all of the magnetic valves, so that the brakes cannot then release. An unintentional movement of the vehicle during the course of the test cycle is therefore not possible.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A wheel lock-up prevention apparatus for the wheel brakes of a motor vehicle, having a common control of the brake pressure in the brake cylinders of a given vehicle axle, comprising:
   a brake line leading to the two brake cylinders;
   a common 3/2-way valve connected to and controlling the brake line;
   at least one separate branch line connected to the common 3/2-way valve and to the brake cylinders;
   a 2/2-way valve connected to and controlling each separate branch line downstream of the common 3/2-way valve; and
   a magnetic pre-control valve connected to the common 3/2-way valve and to each 2/2-way valve, wherein:

(i) each magnetic pre-control valve includes integral closure members;
   (ii) each 2/2-way valve includes spaced diaphragms comprising valve members which are identically configured on their pressure side; and
   (iii) each 2/2-way valve further includes spaced supports, one support for each diaphragm, said supports effecting variably effective surface areas of both diaphragms so that the difference in the effective surface areas of each diaphragm provides for rapid switching of the diaphragms.

2. The wheel lock-up prevention apparatus as defined in claim 1, further wherein:
   (iv) the common 3/2-way valve includes a push rod at one end of which a dish closure body is attached.

3. The wheel lock-up prevention apparatus as defined in claim 1, further wherein:
   (iv) the common 3/2-way valve includes a push rod at one end of which a diaphragm closure body is attached.

4. The wheel lock-up prevention apparatus as defined in claim 1, further wherein:
   (iv) each 2/2-way valve is switched to close the branch controlled by the 2/2-way valve whenever the pre-control valve connected to the particular 2/2-way valve is energized.

* * * * *